US008658590B2

(12) United States Patent
Leininger et al.

(10) Patent No.: US 8,658,590 B2
(45) Date of Patent: Feb. 25, 2014

(54) COATED SODIUM PERCARBONATE PARTICLES

(75) Inventors: Stefan Leininger, Langenselbold (DE); Harald Jakob, Hasselroth (DE); Ulrike Kottke, Gelnhausen (DE)

(73) Assignee: Evonik Degussa GmbH, Essen (DE)

( * ) Notice: Subject to any disclaimer, the term of this patent is extended or adjusted under 35 U.S.C. 154(b) by 676 days.

(21) Appl. No.: 12/310,817

(22) PCT Filed: Jul. 4, 2007

(86) PCT No.: PCT/EP2007/056746
§ 371 (c)(1),
(2), (4) Date: Jun. 25, 2009

(87) PCT Pub. No.: WO2008/012184
PCT Pub. Date: Jan. 31, 2008

(65) Prior Publication Data
US 2010/0035060 A1  Feb. 11, 2010

(30) Foreign Application Priority Data
Jul. 27, 2006 (EP) .................................. 06117994

(51) Int. Cl.
*C11D 3/10* (2006.01)

(52) U.S. Cl.
USPC ........................... 510/529; 510/357; 252/186

(58) Field of Classification Search
USPC .................. 510/529, 357; 252/186
See application file for complete search history.

(56) References Cited

U.S. PATENT DOCUMENTS

| | | | |
|---|---|---|---|
| 4,105,827 A | 8/1978 | Brichard et al. | |
| 4,135,010 A | 1/1979 | Klebe et al. | |
| 4,146,571 A | 3/1979 | Will et al. | |
| 4,156,039 A | 5/1979 | Klebe et al. | |
| 4,325,933 A | 4/1982 | Matsumoto et al. | |
| 4,329,244 A | 5/1982 | Brichard et al. | |
| 4,428,914 A | 1/1984 | Brichard et al. | |
| 4,526,698 A | 7/1985 | Kuroda et al. | |
| 5,332,518 A | 7/1994 | Kuroda et al. | |
| 5,458,801 A | 10/1995 | Oyashiki et al. | |
| 5,462,804 A * | 10/1995 | Kokubu et al. | 428/402.24 |
| 5,560,896 A | 10/1996 | Bewersdorf et al. | |
| 5,851,420 A | 12/1998 | Kim et al. | |
| 5,906,660 A | 5/1999 | Pardini et al. | |
| 5,935,708 A | 8/1999 | Schuette et al. | |
| 6,022,404 A | 2/2000 | Ettlinger et al. | |
| 6,113,805 A * | 9/2000 | Schutte et al. | 252/186.2 |
| 6,159,252 A | 12/2000 | Schutte et al. | |
| 6,165,963 A | 12/2000 | Delroisse et al. | |
| 6,239,095 B1 | 5/2001 | Bertsch-Frank et al. | |
| 6,245,115 B1 | 6/2001 | Appel et al. | |
| 6,267,934 B1 | 7/2001 | Pardini et al. | |
| 6,387,861 B1 | 5/2002 | Van Asperen et al. | |
| 6,465,408 B1 | 10/2002 | Lee et al. | |
| 6,583,098 B1 * | 6/2003 | Cassie | 510/376 |
| 6,800,775 B1 | 10/2004 | Bachmann et al. | |
| 6,900,169 B2 * | 5/2005 | Wasserman et al. | 510/441 |
| 7,588,697 B2 | 9/2009 | Zimmermann et al. | |
| 7,718,592 B2 | 5/2010 | Zimmermann et al. | |
| 7,956,027 B2 | 6/2011 | Leininger et al. | |
| 8,153,576 B2 | 4/2012 | Leininger et al. | |
| 2002/0041843 A1 | 4/2002 | Jakob et al. | |
| 2002/0086807 A1 * | 7/2002 | Lee et al. | 510/309 |
| 2003/0031786 A1 | 2/2003 | Rumpler et al. | |
| 2003/0104967 A1 | 6/2003 | Jakob et al. | |
| 2006/0014658 A1 * | 1/2006 | Zimmermann et al. | 510/375 |
| 2006/0063693 A1 * | 3/2006 | Jakob et al. | 510/445 |
| 2006/0148669 A1 * | 7/2006 | Ulrike Kottke et al. | 510/367 |
| 2006/0148670 A1 * | 7/2006 | Rabe et al. | 510/375 |
| 2006/0249707 A1 * | 11/2006 | Zimmermann et al. | 252/186.27 |
| 2007/0135323 A1 | 6/2007 | Wiedemann et al. | |
| 2007/0275243 A1 | 11/2007 | Sontgerath et al. | |
| 2008/0108538 A1 | 5/2008 | Sontgerath et al. | |
| 2008/0274937 A1 | 11/2008 | Venbrux et al. | |
| 2013/0059765 A1 | 3/2013 | Leininger et al. | |

FOREIGN PATENT DOCUMENTS

| | | |
|---|---|---|
| AU | 31754/95 | 4/1996 |
| CA | 2170599 A1 | 3/1995 |
| DE | 2 417 572 | 11/1974 |
| DE | 26 22 610 | 12/1976 |
| DE | 27 44 574 A1 | 4/1978 |
| DE | 27 12 139 | 9/1978 |
| DE | 195 44 293 | 6/1997 |
| DE | 196 08 000 | 9/1997 |
| DE | 103 20 196 | 7/2004 |
| EP | 0 544 490 A1 | 2/1993 |

(Continued)

OTHER PUBLICATIONS

International Search Report for PCT/EP2007/056746 filed Jul. 4, 2007.
Written Opinion of the International Searching Authority for PCT/EP2007/056746 filed Jul. 4, 2007.
English translation of the International Preliminary Report on Patentability for PCT/EP2007/056746 filed Jul. 4, 2007.

(Continued)

*Primary Examiner* — Nicole M Buie-Hatcher
*Assistant Examiner* — M. Reza Asdjodi
(74) *Attorney, Agent, or Firm* — Law Office of: Michael A. Sanzo, LLC

(57) ABSTRACT

Coated sodium percarbonate particles comprising a core of sodium percarbonate obtainable by fluidized bed buildup granulation, and a coating layer comprising sodium sulfate and sodium carbonate in a weight ratio of from 95:5 to 75:25 and in which the proportion of sodium sulfate and sodium carbonate is at least 80% by weight, effect as a detergent component an improved washing power of the detergent and exhibit a high storage stability in detergent formulations.

20 Claims, No Drawings

(56) References Cited

FOREIGN PATENT DOCUMENTS

| | | |
|---|---|---|
| EP | 0 651 053 A1 | 3/1993 |
| EP | 0 567 140 A1 | 10/1993 |
| EP | 0 703 190 A1 | 3/1996 |
| EP | 0 722 992 A1 | 7/1996 |
| EP | 0 737 738 | 10/1996 |
| EP | 0 787 682 A1 | 8/1997 |
| EP | 0 970 917 A1 | 1/2000 |
| EP | 1 149 800 A1 | 10/2001 |
| EP | 1 612 185 A1 | 1/2006 |
| EP | 1 612 186 A1 | 1/2006 |
| EP | 1 728 762 A1 | 12/2006 |
| EP | 1 903 098 | 3/2008 |
| GB | 1 466 799 | 3/1977 |
| GB | 1 538 893 | 1/1979 |
| GB | 2 123 044 A | 1/1984 |
| GB | 2 309 976 A | 8/1997 |
| WO | WO 95/06615 | 3/1995 |
| WO | WO 95/15292 | 6/1995 |
| WO | WO 97/19890 | 6/1997 |
| WO | WO 99/64156 | 12/1999 |
| WO | WO 00/12808 | 3/2000 |
| WO | WO 00/27975 | 5/2000 |
| WO | WO 00/52124 | 9/2000 |
| WO | WO 00/60043 | 10/2000 |
| WO | WO 00/71666 | 11/2000 |
| WO | WO 01/05925 A1 | 1/2001 |
| WO | WO 03/031045 A1 | 4/2003 |
| WO | WO 2004/039932 A1 | 5/2004 |
| WO | WO 2004/056954 A1 | 7/2004 |
| WO | WO 2004/058640 A1 | 7/2004 |
| WO | WO 2006/003155 | 1/2006 |
| WO | WO 2007/127641 | 11/2007 |
| WO | WO 2008/135464 A1 | 11/2008 |
| WO | WO 2011/134972 | 11/2011 |

OTHER PUBLICATIONS

Reinhardt, et al., "Neue reaktive Bleichaktivatoren-eine Gratwanderung zwischen Bleicheffizienz and Farb-/Faserschädigung," *Tenside Surf Det.* 34(6): 404-409 (1997).

Cole, et al., "Characterization of the Sodium Sulfate-Sodium Phosphate System," *J. Mol. Struct.* 643:101-107 (2002).

Eysel, et al., "Crystal Chemistry and Structure of $Na_2SO_4(I)$ and Its Solid Solutions," *Acta. Cryst.* B41:5-11 (1985).

Linnow, et al., "Investigation of Sodium Sulfate Transitions in a Porous Material Using Humidity- and Temperature-Controlled X-ray Diffraction," *Anal. Chem.* 78:4683-4689 (2006).

Sakaguchi, et al., "The Phase-Transition Phenomenom in a Sodium Sulfate Crystal," *J. Electrochem. Soc.* 131:1942-1943 (1984).

Singhvi, et al., "Effect of Aliovalent Cation Doping on the Electrical Conductivity of $Na_2SO_4$: Role of Charge and Size of the Dopant," J. Solid State Chem. 138: 183-192 (1998).

Steiger, et al., "Crystallization of sodium sulfate phases in porous materials: The phase diagram $Na_2SO_4-H_2O$ and the generation of stress," *Geochimica et Cosmochimica Acta* 72:4291-4306 (2008).

English language translation of Khlapova, et al., "The Hexagonal Burkeite Solid Solution in the $Na_2SO_4-Na_2CO_3$ System," N.S. Kurnakov General and Inorganic Chemistry Institute, Academy of Science USSR. Translated from *Zhurnal Struturnoi Khimi* 4(4):569-575 (1963).

English language abstract for DE 27 12 139, listed as document B4 above.

English language abstract for EP 0 787 682 listed as document B7 above.

English language abstract for WO 95/06615, listed as document B13 above.

English language abstract for WO 03/031045, listed as document B15 above.

Office Action mailed Jul. 19, 2010 for U.S. Appl. No. 12/320,393.

Preliminary Amendment filed for U.S. Appl. No. 12/320,393 on Jan. 26, 2009.

Office Action mailed May 26, 2010 for U.S. Appl. No. 12/320,394.

Response to Office Action filed on Aug. 31, 2010 for U.S. Appl. No. 12/320,394.

Preliminary Amendment filed for U.S. Appl. No. 12/442,865, on Mar. 25, 2009.

Preliminary Amendment filed for U.S. Appl. No. 12/747,918 on Jun. 13, 2010.

Response to Office Action filed Oct. 18, 2010 for copending U.S. Appl. No. 12/320,393.

Notice of Allowance dated Nov. 12, 2010 for copending U.S. Appl. No. 12/320,394.

Office Action dated Nov. 17, 2010 for copending U.S. Appl. No. 12/320,393.

Response to Office Action dated Nov. 17, 2010 for copending U.S. Appl. No. 12/320,393, (Response filed on Feb. 4, 2011).

Office Action mailed Mar. 2, 2011 for copending U.S. Appl. No. 12/320,393.

Notice of Allowance dated Apr. 14, 2011 for copending U.S. Appl. No. 12/320,394.

Response to Office Action filed on Aug. 23, 2011 for copending U.S. Appl. No. 12/320,393.

Species Election Requirement mailed Jul. 11, 2011 for copending U.S. Appl. No. 12/442,865.

Response to Species Election Requirement filed Aug. 6, 2011 for copending U.S. Appl. No. 12/442,865.

Amendment filed Aug. 6, 2011 for copending U.S. Appl. No. 12/442,865.

Office Action for copending U.S. Appl. No. 12/442,865, mailed Dec. 12, 2011.

Response to Office Action of Dec. 12, 2011 for copending U.S. Appl. No. 12/442,865, filed on Apr. 12, 2012.

Final Rejection for copending U.S. Appl. No. 12/442,865, mailed Aug. 10, 2012.

Response to Final Rejection of Aug. 10, 2012 for copending U.S. Appl. No. 12/442,865, filed on Oct. 7, 2012.

Non-Final Office Action for copending U.S. Appl. No. 12/442,865, mailed Oct. 19, 2012.

Preliminary Amendment for copending U.S. Appl. No. 13/643,174, filed Oct. 24, 2012.

Response to Non-Final Office Action of Oct. 19, 2012 for copending U.S. Appl. No. 12/442,865, filed on Jan. 16, 2013.

Non-Final Office Action for copending U.S. Appl. No. 12/747,918, mailed Mar. 5, 2013.

Response to Non-Final Office Action dated Mar. 5, 2013 for copending U.S. Appl. No. 12/747,918, filed Jun. 30, 2013.

Opposition to European counterpart of copending U.S. Appl. No. 12/747,918 (EP 2 080 544), with translation of French portions attached, filed with the European Patent Office on Sep. 1, 2011.

Winge, U., Master's Thesis: "Fluid-bed granulering," Lund University, with English translation of p. 10, chapter 5, appendix 2 (cited as documents D1 and D1(a) in European Opposition to EP 080 544, published Nov. 2002.

Non-Final Rejection for copending U.S. Appl. No. 12/442,865, mailed Sep. 10, 2013.

Notice of Allowance for related U.S. Appl. No. 12/320,393, mailed Oct. 20, 2011.

Response to Non-Final Rejection for copending U.S. Appl. No. 12/442,865, filed Dec. 7, 2013.

Final Rejection for copending U.S. Appl. No. 12/442,865, mailed on Dec. 20, 2013.

Final Office Action for copending U.S. Appl. No. 12/747,918, mailed Dec. 6, 2013.

\* cited by examiner

COATED SODIUM PERCARBONATE PARTICLES

CROSS REFERENCE TO RELATED APPLICATIONS

The present application is US national stage of international application PCT/EP2007/056746, which had an international filing date of Jul. 4, 2007, and which was published in German under PCT Article 21(2) on Jan. 31, 2008. Priority is claimed to European application EP 06117994.1, filed on Jul. 27, 2006 which is hereby incorporated by reference in its entirety.

The invention provides coated sodium percarbonate particles which bring about improved washing power of a detergent as a constituent thereof.

Sodium percarbonate is increasingly being used as a bleaching constituent in detergents and cleaning compositions. For this application, sodium percarbonate must have sufficient storage stability in detergent and cleaning composition formulations, since there is otherwise undesired loss of active oxygen and hence of bleaching action in the course of storage of the detergents and cleaning compositions. Sodium percarbonate is moisture-sensitive and decomposes in detergent and cleaning composition formulations under the action of moisture with loss of active oxygen. To produce detergents or cleaning compositions, sodium percarbonate is therefore typically used in coated form, the coating layers preventing the action of moisture on the coated sodium percarbonate particles. Suitable coating layer of inorganic hydrate-forming salts, for example sodium carbonate, sodium sulfate or magnesium sulfate and mixtures of such salts, are known, for example, from DE 24 17 572, EP-A 0 863 842 and U.S. Pat. No. 4,325,933.

Detergents comprising sodium percarbonate particles should not only possess a high storage stability but additionally have high washing power. Moreover, the sodium percarbonate particles should not exhibit any caking even under the action of pressure, such that they can be stored in silo vessels without solidification.

WO 97/19890 discloses, in working example VB5, sodium percarbonate particles with a core of sodium percarbonate produced by fluidized bed buildup granulation, and a coating layer which consists of sodium sulfate and sodium carbonate and comprises sodium sulfate and sodium carbonate in a weight ratio of 50:50. The sodium percarbonate particles exhibit a high storage stability in detergents. WO 97/19890 does not contain any teaching as to the properties a sodium percarbonate particle needs to have to bring about high washing power in the detergent.

DE 26 22 610 discloses, in working example VB5, sodium percarbonate particles with a core of sodium percarbonate produced by fluidized bed buildup granulation, and a coating layer which consists of sodium sulfate and sodium carbonate and comprises sodium sulfate and sodium carbonate in a weight ratio of 31:69. The sodium percarbonate particles exhibit a high storage stability in detergents. DE 26 22 610 does not contain any teaching as to the properties a sodium percarbonate particle needs to have in order to bring about high washing power in the detergent.

EP 0 651 053 A1 discloses sodium percarbonate particles with a coating layer comprising sodium sulfate and sodium carbonate in a molar ratio of 1:0.1 to 1:3. The working examples disclose sodium percarbonate particles with a coating layer which consists of sodium sulfate and sodium carbonate and comprises sodium sulfate and sodium carbonate in a molar ratio of 1:0.29. This corresponds to a weight ratio of 81:18. EP 0 651 053 A1 does not contain any disclosure as to the structure of the core of the particles or any teaching as to the properties a sodium percarbonate particle needs to have in order to bring about high washing power in the detergent.

EP 1 149 800 A1 discloses sodium percarbonate particles with an inner coating layer which comprises an alkali metal silicate and at least one alkali metal sulfate, carbonate or bicarbonate, and an outer coating layer which comprises an alkali metal sulfate and at least one alkali metal carbonate or bicarbonate. The proportion of alkali metal carbonate or bicarbonate in the outer coating layer is preferably from 10 to 25% by weight. Working example 4 discloses sodium percarbonate particles with an inner coating layer composed of waterglass, sodium carbonate and an alpha-olefinsulfonate, and an outer layer composed of sodium sulfate, sodium carbonate and an alpha-olefin sulfonate. The outer coating layer of these particles comprises sodium sulfate and sodium carbonate in a weight ratio of 78:22; the proportion of sodium sulfate and sodium carbonate in the outer coating layer is 99.3% by weight. The core of these particles is produced by spraying a solution of magnesium sulfate in hydrogen peroxide onto a mixture of solid sodium carbonate and sodium metasilicate in a mixer and then drying in a fluidized bed dryer. EP 1 149 800 A1 does not contain any teaching as to the properties a sodium percarbonate particle needs to have in order to bring about high washing power in the detergent.

It has now been found that, surprisingly, sodium percarbonate particles with a core of sodium percarbonate produced by fluidized bed buildup granulation, and a coating layer which consists essentially of sodium sulfate and sodium carbonate and comprises sodium sulfate and sodium carbonate in a weight ratio of from 95:5 to 75:25, brings about improved washing power of a detergent as a constituent thereof. At the same time, they exhibit no caking under the action of pressure and a high storage stability in the detergent.

The invention therefore provides coated sodium percarbonate particles, comprising a core of sodium percarbonate obtainable by fluidized bed buildup granulation, and a coating layer comprising sodium sulfate and sodium carbonate, wherein the coating layer comprises sodium sulfate and sodium carbonate in a weight ratio of from 95:5 to 75:25 and the proportion of sodium sulfate and sodium carbonate in the coating layer is at least 80% by weight. The invention also provides detergents and cleaning compositions which comprise such sodium percarbonate particles.

The inventive sodium percarbonate particles have a core of sodium percarbonate which is obtainable by fluidized bed buildup granulation from aqueous solutions of hydrogen peroxide and sodium carbonate. Such a fluidized bed buildup granulation affords a core material which differs from core materials obtained by other preparation processes by a particularly dense, shell-like structure and a smoother surface.

The core of the inventive sodium percarbonate particles consists essentially of sodium carbonate perhydrate of composition $2Na_2CO_3 \cdot 3H_2O_2$. It may additionally also comprise small amounts of known stabilizers for peroxygen compounds, for example magnesium salts, silicates, phosphates and/or chelate complexing agents. The proportion of sodium percarbonate in the core of the inventive sodium percarbonate particles is preferably more than 80% by weight and more preferably more than 95% by weight. The proportion of organic carbon compounds in the core is preferably less than 1% by weight, more preferably less than 0.1% by weight.

In a preferred embodiment, the core comprises small amounts of additives which have a stabilizing effect on the active oxygen content, in which case the proportion of stabilizing additives in the core is preferably less than 2% by weight. The stability-increasing additives used are preferably magnesium salts, waterglass, stannates, pyrophosphates, polyphosphates, and chelate complexing agents from the group of the hydroxycarboxylic acids, aminocarboxylic acids, aminophosphonic acids, phosphonocarboxylic and hydroxyphosphonic acids, and the alkali metal, ammonium or magnesium salts thereof. In a particularly preferred embodiment, the core comprises, as a stabilizing additive, an alkali metal silicate, preferably waterglass with an $SiO_2/Na_2O$ modulus in the range from 1 to 3, in an amount of from 0.1 to 1% by weight. In the most preferred embodiment, the core, in addition to this amount of alkali metal silicate, also comprises a magnesium compound in an amount of from 50 to 2000 ppm of $Mg^{2+}$.

The inventive coated sodium percarbonate particles comprise, in addition to the core composed of sodium percarbonate obtainable by fluidized bed buildup granulation, also a coating layer which comprises sodium sulfate and sodium carbonate in a weight ratio of from 95:5 to 75:25. The weight ratio of sodium sulfate and sodium carbonate is preferably in the range from 95:5 to 80:20, more preferably in the range from 90:10 to 80:20. The proportion of sodium sulfate and sodium carbonate in the coating layer is at least 80% by weight, preferably at least 90% by weight. The proportion by weight of the coating layer based on the mass of the sodium percarbonate particle is preferably from 2 to 10%, more preferably from 4 to 7%.

The sodium carbonate present in the coating layer is present in the coating layer preferably to an extent of more than 80% in the form of burkeite of composition $Na_4(SO_4)_{1+n}(CO_3)_{1-n}$ where n is from 0 to 0.5. The proportion of burkeite relative to other phases which comprise sodium carbonate and are present in the sodium percarbonate particles can be determined by Rietveld analysis of powder X-ray diagrams of the sodium percarbonate particles.

In a preferred embodiment, the coating layer comprising sodium sulfate and sodium carbonate additionally comprises from 0.1 to 1% by weight of sodium silicate, more preferably from 0.2 to 0.5% by weight of sodium silicate. The sodium silicate is preferably a water-soluble sodium silicate, especially a waterglass. The addition of small amounts of sodium silicate allows the storage stability of the inventive sodium percarbonate particles in detergents to be improved further, without impairing the silo storability of the sodium percarbonate.

In addition to the inventive coating layer which comprises sodium sulfate and sodium carbonate, the inventive sodium percarbonate particles may also comprise one or more further coating layers, which may be disposed either between the core and the inventive coating layer or outside the inventive coating layer. The inventive coating layer preferably immediately adjoins the core material of sodium percarbonate.

Between the coating layers and between the innermost coating layer and the core, there may exist a sharp boundary at which the composition changes abruptly. In general, however, there will be a transition zone in each case between the individual coating layers and between the innermost coating layer and the core, said transition zone comprising the components of both adjacent layers. Such transition zones form, for example, as a result of the application of a coating layer in the form of an aqueous solution, a portion of the layer below being partly dissolved at the start of the layer buildup, so as to form a transition zone which comprises the constituents of both layers. In the preferred embodiment, in which the inventive coating layer is present immediately on the core material of sodium percarbonate, a transition layer which comprises sodium sulfate, sodium carbonate, sodium hydrogen-carbonate and sodium percarbonate, and also mixed salts of these components, may thus form between the core and the inventive coating layer.

The inventive coating layer which comprises sodium sulfate and sodium carbonate is preferably configured such that it covers the material below it to an extent of more than 95%, preferably to an extent of more than 98% and especially completely.

In a preferred embodiment, the inventive sodium percarbonate particles have a coating layer which is obtained by spray application of an aqueous solution which comprises dissolved sodium sulfate and sodium carbonate and comprises a total of not more than 25% by weight, preferably from 10 to 25% by weight, of dissolved salts. While the prior art teaches use of highly concentrated solutions of the coating components to apply a coating layer, in order to minimize the amount of water to be evaporated, it has now been found that, surprisingly, sodium percarbonate particles with an inventive coating layer which comprises sodium sulfate and sodium carbonate and which is obtainable by spray application of an aqueous solution comprising not more than 25% by weight of dissolved salts have a better storage stability in detergent and cleaning composition formulations than sodium percarbonate particles which are obtainable by spray application of an aqueous solution with a higher content of dissolved salts.

During the spray application of the aqueous solution which comprises dissolved sodium sulfate and sodium carbonate, the majority of the water present therein, especially more than 90% of the water present in the aqueous solution, is preferably already evaporated as a result of supply of heat, such that only a small portion of the material below it is partly dissolved again during the spray application of the coating layer and a solid coating layer forms already during the spray application. The inventive coating layer is applied preferably by spraying an aqueous solution comprising sodium sulfate and sodium carbonate in a coating layer and more preferably by the process described in EP-A 0 970 917, with which it is possible to achieve a dense coating layer even with small amounts of coating layer material. The coating layer is applied in a fluidized bed preferably with supply of a drying gas to the fluidized bed, such that a temperature in the range from 30 to 90° C., preferably from 30 to 55° C., is established in the fluidized bed. Surprisingly, the spray application of the coating layer at a temperature of the fluidized bed in the range from 30 to 55° C. leads to sodium percarbonate particles which have a lower caking tendency and a better storage stability in detergents than sodium percarbonate particles whose coating layer has been applied by spray application of a solution of the same composition at a temperature of the fluidized bed outside this range.

The inventive sodium percarbonate particles with a core of sodium percarbonate obtainable by fluidized bed buildup granulation, and a coating layer which comprises sodium sulfate and sodium carbonate in a weight ratio of from 95:5 to 75:25, surprisingly bring about higher washing power in detergents than is achieved with the same amount of sodium percarbonate particles which have a core obtainable by a different production process and a coating layer of otherwise identical composition. They likewise bring about higher washing power than sodium percarbonate particles with a core of sodium percarbonate obtainable by fluidized bed buildup granulation and a comparably thick coating layer which comprises only sodium sulfate.

At the same time, the inventive sodium percarbonate particles exhibit a particularly high storage stability in detergents, which is even higher than the storage stability of sodium percarbonate particles with a core of sodium percarbonate obtainable by fluidized bed buildup granulation and a comparably thick coating layer which comprises only sodium sulfate or sodium sulfate and sodium carbonate with a higher sodium carbonate fraction.

The invention sodium percarbonate particles also exhibit only slight caking, if any, under the action of pressure and only a small release of heat in substance and can therefore be stored safely in a silo, without there being any caking in the silo or any self-heating of the silo contents.

In a further embodiment of the invention, the coated sodium percarbonate particles may have an additional coating layer which, as the main constituent, comprises an alkali metal silicate having an $SiO_2$ to alkali metal oxide modulus of more than 2.5. The additional coating layer is preferably present on top of the inventive coating layer. The additional coating layer comprises an alkali metal silicate as the main constituent when it does not comprise any further component in a proportion by weight greater than the proportion of alkali metal silicate. The modulus of the alkali metal silicate is preferably in the range from 3 to 5 and more preferably in the range from 3.2 to 4.2. The proportion of the additional coating layer in the inventive coated sodium percarbonate particles is preferably in the range from 0.2 to 3% by weight. The proportion of alkali metal silicate in the material of the additional coating layer is preferably more than 50% by weight and more preferably more than 80% by weight. The alkali metal silicate used in the additional coating layer is preferably sodium silicate and more preferably sodium waterglass.

Sodium percarbonate particles which have been coated in accordance with the invention and have an additional coating layer which comprises, as the main constituent, an alkali metal silicate having an $SiO_2$ to alkali metal oxide modulus of more than 2.5 additionally exhibit a retarded dissolution time in water and an improved storage stability in aqueous liquid or gel-form media at water contents of up to 15% by weight. They can therefore be used advantageously to produce liquid or gel-form detergent or cleaning composition formulations.

In a further embodiment of the invention, the coated sodium percarbonate particles may additionally have, on their surface, from 0.01 to 1% by weight, preferably from 0.1 to 0.5% by weight, of a fine oxide of the elements Si, Al or Ti, or of a mixed oxide of these elements. Suitable fine oxides are, for example, pyrogenic oxides which are obtained by flame hydrolysis of volatile compounds of the elements silicon, aluminum or titanium, or of mixtures of these compounds. The pyrogenic oxides or mixed oxides obtainable by this route preferably have a mean primary particle size of less than 50 nm and may be aggregated to larger particles whose mean particle size is preferably less than 20 µm. Likewise suitable are precipitated oxides which have been precipitated from aqueous solutions of compounds of the elements silicon, aluminum or titanium, or mixtures of these compounds. The precipitated oxides or mixed oxides may, as well as silicon, aluminum and/or titanium, also comprise small amounts of alkali metal or alkaline earth metal ions. The mean particle size of the precipitated oxides is preferably less than 50 µm and more preferably less than 20 µm. The specific BET surface area of the fine oxides is preferably in the range from 100 to 300 $m^2/g$.

The coated sodium percarbonate particles preferably have, on their surface, a hydrophobized fine oxide and more preferably a hydrophobized fumed or precipitated silica. Hydrophobized oxides in the context of the invention are oxides which have, on their surface, organic radicals bonded via chemical bonds and are not wetted by water. Hydrophobized oxides can be prepared, for example, by reacting pyrogenic or precipitated oxides with organosilanes, silazanes or polysiloxanes. Suitable silicon compounds for preparing hydrophobized oxides are known from EP-A 0 722 992, page 3 line 9 to page 6 line 6. Particular preference is given to hydrophobized oxides which have been prepared by reacting a fine oxide with a silicon compound of compound classes (a) to (e) and (k) to (m) listed in EP-A 0 722 992. The hydrophobized fine oxides preferably have a methanol wettability of at least 40.

Sodium percarbonate particles which have been coated in accordance with the invention and additionally have, on their surface, a fine oxide exhibit an even lower tendency to cake in the course of storage, in particular in the course of storage under pressure stress, and therefore have even better silo storability. Furthermore, such particles in detergent and cleaning composition formulations have a further increased storage stability.

The inventive sodium percarbonate particles preferably have a mass-based median particle size in the range from 0.2 to 5 mm and more preferably in the range from 0.5 to 2 mm. Preference is given to sodium percarbonate particles having a low fines fraction, preferably having a fraction of less than 10% by weight of particles smaller than 0.2 mm and more preferably less than 10% by weight of particles having a particle size of less than 0.3 mm. An appropriate selection of the particle size allows the storage stability of the inventive sodium percarbonate particles in detergent and cleaning composition formulations to be improved further.

The inventive coated sodium percarbonate particles can advantageously be used as a bleaching constituent in detergents and cleaning compositions. Detergents in the context of the invention are all formulations which are suitable for cleaning textiles in an aqueous wash liquor. Cleaning compositions in the context of the invention are all formulations which, in interaction with water, are suitable for cleaning surfaces which absorb only a small amount of water, if any. A form of cleaning compositions preferred in the context of the invention is that of machine dishwasher detergents which are suitable for machine cleaning of dishware and cutlery.

The invention further provides detergents and cleaning compositions which comprise sodium percarbonate particles coated in accordance with the invention. The inventive detergents and cleaning compositions comprise the inventive coated sodium percarbonate particles preferably in an amount of from 1 to 40% by weight based on the total amount of detergent or cleaning composition.

The inventive detergents and cleaning compositions may be in solid form and may then also comprise further components in the form of powder or in the form of granules beside the inventive coated sodium percarbonate particles. Furthermore, they may also comprise press-shaped bodies, in which case the inventive coated sodium percarbonate particles may be part of the press-shaped bodies. Such press-shaped bodies in the form of extrudates, pellets, briquets or tablets can be produced by processes for pressing agglomeration, especially by extrusion, strand pressing, perforation pressing, roller compaction or tabletting. For the performance of the pressing agglomeration, the inventive detergents or cleaning compositions may additionally comprise a binder which imparts a higher strength to the shaped bodies in the course of pressing agglomeration. However, for inventive detergents and cleaning compositions comprising press-shaped bodies preference is given to not using any additional binder and one of the wash-active constituents, for example a nonionic surfactant, fulfills the function of the binder.

The inventive detergents and cleaning compositions may additionally also be in liquid form or gel form and comprise the inventive coated sodium percarbonate particles dispersed in a liquid phase, or a gel phase. In addition to the inventive coated sodium percarbonate particles, further particles may be dispersed in the liquid phase, or the gel phase. The rheological properties of the liquid phase, or of the gel phase are preferably adjusted such that the particles dispersed therein remain suspended and do not settle during storage. The composition of a liquid phase is preferably selected in such a way that it has thixotropic or pseudoplastic flow properties. To establish such flow properties, suspension auxiliaries, such as swelling clays, especially montmorillonites, precipitated and fumed silicas, vegetable gums, especially xanthans, and polymeric gelling agents, such as vinyl polymers containing carboxyl groups, may be added.

Inventive detergents and cleaning compositions in liquid form or gel form preferably comprise inventive coated sodium percarbonate particles with an additional coating layer which, as the main constituent, comprises an alkali metal silicate having an $SiO_2$ to alkali metal oxide modulus of more than 2.5 In this embodiment, the detergents and cleaning compositions may comprise up to 15% by weight of water without there being any partial dissolution of the coated sodium percarbonate particles and a resulting release of hydrogen peroxide into the liquid phase or gel phase during storage.

The inventive detergents and cleaning compositions may, as well as the inventive coated sodium percarbonate particles, comprise, as further components, for example, also surfactants, builders, alkaline components, bleach activators, enzymes, chelating complexing agents, graying inhibitors, foam inhibitors, optical brighteners, fragrances and dyes.

Suitable surfactants for the inventive detergents and cleaning compositions are in particular anionic, nonionic and cationic surfactants.

Suitable anionic surfactants are, for example, surfactants with sulfonate groups, preferably alkylbenzenesulfonates, alkanesulfonates, alpha-olefinsulfonates, alpha-sulfo fatty acid esters or sulfosuccinates. In the case of alkylbenzenesulfonates, preference is given to those having a straight-chain or branched alkyl group having from 8 to 20 carbon atoms, especially having from 10 to 16 carbon atoms. Preferred alkanesulfonates are those with straight alkyl chains having from 12 to 18 carbon atoms. In the case of alpha-olefinsulfonates, preference is given to the reaction products of the sulfonation of alpha-olefins having from 12 to 18 carbon atoms. In the case of the alpha-sulfo fatty acid esters, preference is given to sulfonation products of fatty acid esters formed from fatty acids having from 12 to 18 carbon atoms and short-chain alcohols having from 1 to 3 carbon atoms. Suitable anionic surfactants also include surfactants having a sulfate group in the molecule, preferably alkyl sulfates and ether sulfates. Preferred alkyl sulfates are those with straight-chain alkyl radicals having from 12 to 18 carbon atoms. Also suitable are beta-branched alkyl sulfates and alkyl sulfates mono- or poly-alkyl-substituted in the middle of the longest alkyl chain. Preferred ether sulfates are the alkyl ether sulfates which are obtained by ethoxylating linear alcohols having from 12 to 18 carbon atoms with from 2 to 6 ethylene oxide units and then sulphating. The anionic surfactants used may finally also be soaps, for example alkali metal salts of lauric acid, myristic acid, palmitic acid, stearic acid and/or natural fatty acid mixtures, for example coconut, palm kernel or tallow fatty acids.

Suitable nonionic surfactants are, for example, alkoxylated compounds, especially ethoxylated and propoxylated compounds. Particularly suitable nonionic surfactants are condensation products of alkylphenols or fatty alcohols with from 1 to 50 mol, preferably from 1 to 10 mol, of ethylene oxide and/or propylene oxide. Likewise suitable are polyhydroxy fatty acid amides in which an organic radical having one or more hydroxyl groups which may also be alkoxylated is bonded to the amide nitrogen. Likewise suitable as nonionic surfactants are alkylglycosides with a straight-chain or branched alkyl group having from 8 to 22 carbon atoms, especially having from 12 to 18 carbon atoms, and a mono- or diglycoside radical, which is preferably derived from glucose.

Suitable cationic surfactants are, for example, mono- and dialkoxylated quaternary amines having a $C_6$- to $C_{18}$-alkyl radical bonded to the nitrogen and one or two hydroxyalkyl groups.

The inventive detergents and cleaning compositions generally also comprise builders which are capable of binding calcium and magnesium ions dissolved in water in the course of use. Suitable builders are alkali metal phosphates and alkali metal polyphosphates, especially pentasodium triphosphate; water-soluble and water-insoluble sodium silicates, especially sheet silicates of the formula $Na_5Si_2O_5$; zeolites of the A, X and/or P structures; and trisodium citrate. In addition to the builders, it is also possible to use organic cobuilders, for example polyacrylic acid, polyaspartic acid and/or acrylic acid copolymers with methacrylic acid, acrolein or vinyl monomers containing sulfonic acid, and the alkali metal salts thereof.

The inventive detergents and cleaning compositions generally also comprise alkaline components which upon the intended use bring about a pH in the range from 8 to 12 in the wash liquor, or the aqueous cleaning composition solution. Suitable alkaline components are in particular sodium carbonate, sodium sesquicarbonate, sodium metasilicate and other soluble alkali metal silicates.

Suitable bleach activators for the inventive detergents and cleaning compositions are in particular compounds having one or more perhydrolyzable acyl groups bonded to nitrogen or to oxygen, which react with the hydrogen peroxide released from the sodium percarbonate particles in the wash liquor, or the aqueous cleaning composition solution, to give peroxycarboxylic acids. Examples of such compounds are polyacylated alkylenediamines, especially tetraacetylethylenediamine (TAED); acylated triazine derivatives, especially 1,5-diacetyl-2,4-dioxohexahydro-1,3,5-triazine (DADHT); acylated glycolurils, especially tetraacetylglycoluril (TAGU); N-acylimides, especially N-nonanoylsuccinimide (NOSI); acylated phenolsulfonates, especially n-nonanoyl- or isononanoyloxybenzenesulfonate (n- or iso-NOBS); carboxylic anhydrides such as phthalic anhydride; acylated polyhydric alcohols such as ethylene glycol diacetate, 2,5-diacetoxy-2,5-dihydrofuran, acetylated sorbitol and mannitol, and acylated sugars such as pentaacetylglucose; enol esters; and N-acylated lactams, especially N-acylcaprolactams and N-acylvalerolactams. Likewise suitable as bleach activators are amino-functionalized nitriles and salts thereof (nitrile quats), which are known, for example, from the journal Tenside Surf. Det. 1997, 34(6), pages 404-409. The bleach activators used may also be transition metal complexes which can activate hydrogen peroxide for bleaching stain removal. Suitable transition metal complexes are, for example, known from EP-A 0 544 490 page 2 line 4 to page 3 line 57; WO 00/52124 page 5 line 9 to page 8 line 7 and page 8 line 19 to page 11, line 14; WO 04/039932 page 2 line 25 to page 10 line 21; WO 00/12808 page 6 line 29 to page 33 line 29; WO 00/60043 page 6 line 9 to page 17 line 22; WO 00/27975 page 2 lines 1 to 18 and page 3 line 7 to page 4 line 6; WO 01/05925 page 1 line 28 to page 3 line 14; WO 99/64156 page 2 line 25 to page 9 line 18; and GB-A 2 309 976 page 3 line 1 to page 8 line 32.

The inventive detergents and cleaning compositions may further comprise enzymes which enhance the cleaning action, especially lipases, cutinases, amylases, neutral and alkaline proteases, esterases, cellulases, pectinases, lactases and/or peroxidases. The enzymes may be adsorbed on carrier substances or be embedded into coating substances in order to protect them from decomposition.

The inventive detergents and cleaning compositions may also comprise chelating complexing agents for transition metals, with which a catalytic decomposition of active oxygen compounds in the wash liquor, or the aqueous cleaning composition solution, can be prevented. Suitable examples are phosphonates, such as hydroxyethane-1,1-disphosphonate, nitrilotrimethylenephosphonate, diethylenetriamine-penta(methylenephosphonate), ethylenediaminetetra(methylenephosphonate), hexamethylenediaminetetra (methylenephosphonate) and the alkali metal salts thereof. Likewise suitable are nitrilotriacetic acid and polyaminocarboxylic acids, especially ethylenediaminetetraacetic acid, diethylenetriaminopentaacetic acid, ethylenediamine-N,N'-disuccinic acid, methylglycinediacetic acid and polyaspartates, and the alkali metal and ammonium salts thereof. Finally, polybasic carboxylic acids and especially hydroxycarboxylic acids, especially tartaric acid and citric acid, are also suitable as chelating complexing agents.

The inventive detergents may additionally comprise graying inhibitors which keep soil detached from the fiber suspended and prevent reattachment of the soil to the fiber. Suitable graying inhibitors are, for example, cellulose ethers such as carboxymethylcellulose and the alkali metal salts thereof, methylcellulose, hydroxyethylcellulose and hydroxypropylcellulose. Polyvinylpyrrolidone is likewise suitable.

The inventive detergents and cleaning compositions may further also comprise foam inhibitors which reduce foam formation in the wash liquor. Suitable foam inhibitors are, for example, organopolysiloxanes such as polydimethylsiloxane, paraffins and/or waxes, and mixtures thereof with fine silicas.

The inventive detergents may optionally comprise optical brighteners which attach to the fiber, absorb light in the UV range and fluoresce in a blue color in order to compensate for yellowing of the fiber. Suitable optical brighteners are, for example, derivatives of diaminostilbenedisulfonic acid, such as alkali metal salts of 4,4'-bis(2-anilino-4-morpholino-1,3, 5-triazinyl-6-amino)stilbene-2,2'-disulfonic acid, or substituted diphenylstyryls, such as alkali metal salts of 4,4'-bis(2-sulfostyryl)diphenyl.

The inventive detergents and cleaning compositions may finally also comprise fragrances and dyes.

Inventive detergents and cleaning compositions in liquid form or gel form may additionally also comprise up to 30% by weight of organic solvent, for example methanol, ethanol, n-propanol, isopropanol, n-butanol, ethylene glycol, 1,2-propylene glycol, 1,3-propylene glycol, 1,4-butylene glycol, glycerol, diethylene glycol, ethylene glycol methyl ether, ethanolamine, diethanolamine and/or triethanolamine.

As compared with cleaning compositions which do not comprise sodium percarbonate particles coated in accordance with the invention, the inventive cleaning compositions exhibit a better storage stability with lower losses of active oxygen content in the course of storage under moist conditions.

One embodiment of the inventive cleaning compositions is that of machine dishwasher detergents, preferably in the form of tablets, in which case the dishwasher detergents may also comprise a silver anticorrosive beside the inventive coated sodium percarbonate particles. Silver anticorrosives are agents which reduce or prevent the tarnishing of nonferrous metals, especially of silver, during machine cleaning with the machine dishwasher detergent. Suitable silver anticorrosives are compounds from the group of the triazoles, benzotriazoles, bisbenzotriazoles, aminotriazole and alkylaminotriazoles. The compounds of the substance classes mentioned may also have substituents, for example linear or branched alkyl groups having from 1 to 20 carbon atoms, as well as vinyl, hydroxyl, thiol or halogen radicals. In the case of bisbenzotriazoles, preference is given to compounds in which the two benzotriazole groups are each bonded in the 6 position via an X group, where X may be a bond, a straight-chain alkylene group which is optionally substituted by one or more $C_1$- to $C_4$-alkyl groups and has preferably from 1 to 6 carbon atoms, a cycloalkyl radical having at least 5 carbon atoms, a carbonyl group, a sulfonyl group, an oxygen atom or a sulphur atom. A particularly preferred silver anticorrosive is tolyltriazole.

EXAMPLES

Preparation of Coated Sodium Percarbonate Particles

To produce the coated sodium percarbonate particles, sodium percarbonate particles were used which had been prepared by the process described in EP-B 0 716 640 by fluidized bed buildup granulation from aqueous hydrogen peroxide solution and aqueous sodium carbonate solution and had a mean particle diameter $x_{50}$ of 0.78 mm and a fines fraction of smaller than 0.2 mm of less than 2% by weight. The coating layer was applied to these particles by the process described in EP-B 0 863 842 in paragraph [0021] by spraying on a 20% by weight aqueous solution of the coating substances in a fluidized bed at a fluidized bed temperature of from 55 to 60° C. and simultaneously evaporating water. The amounts of coating substance reported in percent by weight in table 1 are based on the total amount of coating substances sprayed on, calculated without water of crystallization, relative to the total amount of sodium percarbonate particles and coating substances used.

Storage Stability in Washing Powder

To determine the storage stability in washing powder, 405 g of zeolite-containing heavy-duty powder detergent IEC-A* BASE (wfk-Testgewebe GmbH, Krefeld) were mixed with 15 g of TAED and 80 g of sodium percarbonate in a tumbling mixer for at least 10 min. The mixture was filled into an E2 detergent package (dimensions 19×14×4.5 cm) having a water-repellent impregnation, which was sealed with hotmelt adhesive. The detergent package was then stored in a climate-controlled cabinet at 35° C. and 80% relative air humidity. After the detergent package had been cooled to room temperature outside the climate-controlled cabinet, the contents of the detergent package were divided by means of a sample divider into samples of 12 g each. The active oxygen content before and after storage was determined by permanganometry in a customary manner. The active oxygen content before the storage and the active oxygen content after 8 weeks of storage were used to determine the retention of the active oxygen content (Oa retention) in percent as a measure of the storage stability in washing powder.

TABLE 1

Storage stability of coated sodium percarbonate
particles in washing powder

| Composition of the coating layer in parts by weight | Amount of coating materials [% by wt.] | Storage stability [Oa retention in percent] |
|---|---|---|
| $Na_2SO_4$ 100* | 4.25 | 49 |
| $Na_2SO_4/Na_2CO_3$ 90:10 | 4.25 | 75 |
| $Na_2SO_4/Na_2CO_3$ 80:20 | 4.25 | 78 |
| $Na_2SO_4/Na_2CO_3$ 70:30* | 4.25 | 51 |
| $Na_2SO_4/Na_2CO_3$ 60:40* | 4.25 | 42 |
| $Na_2SO_4$ 100* | 4 | 53 |
| $Na_2SO_4/Na_2CO_3/NaWG^‡$ 89.88:9.88:0.25 | 4 | 81 |
| $Na_2SO_4/Na_2CO_3/NaWG^‡$ 89.75:9.75:0.5 | 4 | 82 |

*noninventive
‡NaWG = soda waterglass

The tests were repeated for a coating substance composition of 90 parts by weight of sodium sulfate and 10 parts by weight of sodium carbonate or pure sodium sulfate, whereupon 4% by weight of coating substances were sprayed on at a constant spray rate of 11 g/min and the concentration of the coating substances in the solution sprayed was varied from 15 to 30% by weight.

TABLE 2

Storage stability of coated sodium percarbonate
particles in washing powder

| Composition of the coating layer in parts by weight | Storage stability as a function of the concentration of the solution sprayed on [Oa retention in percent] | | | |
|---|---|---|---|---|
| | 15% by wt. | 20% by wt. | 25% by wt. | 30% by wt. |
| $Na_2SO_4$ 100* | 45 | 53 | 43 | 44 |
| $Na_2SO_4/Na_2CO_3$ 90:10 | 66 | 79 | 68 | 53 |

*noninventive

The tests were repeated for a coating substance composition of 90 parts by weight of sodium sulfate and 10 parts by weight of sodium carbonate or pure sodium sulfate, 4% by weight of coating substances having been sprayed on as a 20% by weight solution and the temperature of the fluidized bed during the spray application having been varied from 25 to 85° C.

TABLE 3

Storage stability of coated sodium percarbonate
particles in washing powder

| Composition of the coating layer in parts by weight | Storage stability as a function of the fluidized bed temperature [Oa retention in percent] | | | |
|---|---|---|---|---|
| | 35° C. | 45° C. | 55° C. | 65° C. |
| $Na_2SO_4$ 100* | 41 | 48 | 51 | |
| $Na_2SO_4/Na_2CO_3$ 90:10 | 79 | 82 | 72 | 70 |

*noninventive

Determination of the Primary Washing Capacity

The experiments to prepare coated sodium percarbonate were repeated for a coating substance composition of 90 parts by weight of sodium sulfate and 10 parts by weight of sodium carbonate or of pure sodium sulfate, whereupon 6% by weight of coating substances were sprayed on. For comparison, under the same conditions, a coating composed of 90 parts by weight of sodium sulfate and 10 parts by weight of sodium carbonate with 6% by weight of coating substances was also applied to a crystallisate prepared by the process of DE 2 744 574, which had a mean particle diameter $x_{50}$ of 0.44 mm and a fines fraction of smaller than 0.2 mm of less than 2% by weight. The coated sodium percarbonate thus prepared was used to prepare detergent formulations by mixing 80 parts by weight of base detergent IEC-A* BASE (wfk-Testgewebe GmbH, Krefeld), 15 parts by weight of sodium percarbonate and 5 parts by weight of TAED (Clariant).

These detergent formulations were used, in a Miele Mondia 1120 domestic washing machine, at wash temperature 40° C., to wash the test fabrics with standardized stains listed in table 4 together with 3.5 kg of cotton fabric without prewash. The stain removal from the test fabrics was determined by measuring the reflectance at 457 nm in diffuse reflection on the dried test fabric with a Datacolor Elrepho 450 photometer. In each case 5 wash tests were carried out, and the mean values and the least significant differences (LSDs) for the increase in reflectance were determined. The results of the wash tests are compiled in table 5.

The results from table 5 show a significantly better washing power for 7 of the 11 stains tested with the inventive sodium percarbonate as compared with sodium percarbonate coated only with sodium sulfate. As compared with a crystallisate coated with the same coating layer, significantly better washing power was found for 9 of 11 stains tested.

TABLE 4

Test fabrics for the wash tests

| Stain | Manufacturer's designation |
|---|---|
| red wine | Empa 114 |
| tea | CFT C-BC-01 |
| coffee | wfk 10 K |
| blackcurrant juice | wfk 10 JB |
| curry | wfk 10 U |
| blood/milk/ink | Empa 116 |
| aged blood | CFT C-S-01 |
| aged milk/cocoa | wfk 10 MF |
| soot/olive oil | Empa 101 |
| pigment/wool fat | wfk 10 C |
| pigment/sebum | wfk 20 D |

Empa = Eidgenössische Materialprüfungs-und Forschungsanstalt, St. Gallen, Switzerland
wfk = wfk-Testgewebe GmbH, Krefeld, Germany
CFT = Center for Test Materials, Vlaardingen, The Netherlands

TABLE 5

Increase in reflectance in the wash test

| | Increase in reflectance [%] | | | |
|---|---|---|---|---|
| Stain | FB granules coating layer $Na_2SO_4$ 100 parts* | FB granules coating layer $Na_2SO_4/Na_2CO_3$ 90:10 parts | Crystallisate coating layer $Na_2SO_4/Na_2CO_3$ 90:10 parts* | LSD |
| red wine | 22.9 | 23.7 | 21.2 | 1.0 |
| tea | 10.4 | 10.7 | 10.1 | 0.3 |
| coffee | 41.6 | 42.1 | 39.4 | 0.3 |
| blackcurrant juice | 49.1 | 49.6 | 46.5 | 0.4 |
| curry | 28.0 | 29.0 | 29.5 | 0.6 |
| blood/milk/ink | 31.6 | 32.1 | 30.1 | 1.6 |
| aged blood | 28.3 | 31.0 | 26.7 | 1.7 |

TABLE 5-continued

Increase in reflectance in the wash test

| Stain | Increase in reflectance [%] | | | |
|---|---|---|---|---|
| | FB granules coating layer $Na_2SO_4$ 100 parts* | FB granules coating layer $Na_2SO_4/Na_2CO_3$ 90:10 parts | Crystallisate coating layer $Na_2SO_4/Na_2CO_3$ 90:10 parts* | LSD |
| aged milk/cocoa | 22.8 | 25.4 | 19.4 | 1.2 |
| soot/olive oil | 24.8 | 27.2 | 23.4 | 1.5 |
| pigment/wool fat | 12.8 | 16.7 | 17.8 | 1.0 |
| pigment/sebum | 33.5 | 32.9 | 29.1 | 1.2 |

*noninventive
FB granules = fluidized bed granules
LSD = least significant difference

The invention claimed is:

1. Coated sodium percarbonate particles, comprising a core of sodium percarbonate obtainable by fluidized bed buildup granulation, and a coating layer comprising sodium sulfate and sodium carbonate, wherein the coating layer comprises sodium sulfate and sodium carbonate in a weight ratio of from 95:5 to 75:25 and the proportion of sodium sulfate and sodium carbonate in the coating layer is at least 80% by weight.

2. The coated sodium percarbonate particles of claim 1, wherein the sodium carbonate present in the coating layer is present to an extent of more than 80% in the form of burkeite of composition $Na_4(SO_4)_{1+n}(CO_3)_{1-n}$ where n is from 0 to 0.5.

3. The coated sodium percarbonate particles of claim 1, wherein, in addition to said sodium sulfate and sodium carbonate, said coating layer further comprises from 0.1 to 1% by weight of sodium silicate.

4. The coated sodium percarbonate particles of claim 1, wherein the coating layer comprising sodium sulfate and sodium carbonate immediately adjoins the core of sodium percarbonate.

5. The coated sodium percarbonate particles of claim 1, wherein the particles have a proportion by weight of the coating layer of from 2 to 10% based on the mass of the sodium percarbonate particle.

6. The coated sodium percarbonate particles of claim 1, wherein the coating layer is obtainable by spraying on an aqueous solution comprising sodium sulfate and sodium carbonate with a total content of salts of less than 25% by weight in a fluidized bed and simultaneous evaporation of water.

7. The coated sodium percarbonate particles of claim 1, wherein the particles have a mass-based median particle size in the range from 0.2 to 5 mm and less than 10% by weight of the particles are smaller than 0.2 mm.

8. A detergent comprising sodium percarbonate particles as claimed in claim 1.

9. The detergent of claim 8, wherein the sodium carbonate present in the coating layer of said coated sodium percarbonate particles is present to an extent of more than 80% in the form of burkeite of composition $Na_4(SO_4)_{1+n}(CO_3)_{1-n}$ where n is from 0 to 0.5.

10. The detergent of claim 8, wherein, in addition to said sodium sulfate and sodium carbonate, the coating layer in said coated sodium percarbonate particles further comprises from 0.1 to 1% by weight of sodium silicate.

11. The detergent of claim 8, wherein the coating layer comprising sodium sulfate and sodium carbonate immediately adjoins the core of sodium percarbonate in said coated sodium percarbonate particles.

12. The detergent of claim 8, wherein the coated sodium percarbonate particles have a proportion by weight of the coating layer of from 2 to 10% based on the mass of the sodium percarbonate particle.

13. The detergent of claim 8, wherein the coating layer of the coated sodium percarbonate particles is obtained by spraying on an aqueous solution comprising sodium sulfate and sodium carbonate with a total content of salts of less than 25% by weight in a fluidized bed and simultaneous evaporation of water.

14. The detergent of claim 8, wherein the coated sodium percarbonate particles have a mass-based median particle size in the range from 0.2 to 5 mm and less than 10% by weight of the particles are smaller than 0.2 mm.

15. A cleaning composition comprising sodium percarbonate particles as claimed in claim 1.

16. The cleaning composition of claim 15, wherein the sodium carbonate present in the coating layer of said coated sodium percarbonate particles is present to an extent of more than 80% in the form of burkeite of composition $Na_4(SO_4)_{1+n}(CO_3)_{1-n}$ where n is from 0 to 0.5.

17. The cleaning composition of claim 15, wherein, in addition to said sodium sulfate and sodium carbonate, the coating layer in said coated sodium percarbonate particles further comprises from 0.1 to 1% by weight of sodium silicate.

18. The cleaning composition of claim 15, wherein the coating layer comprising sodium sulfate and sodium carbonate immediately adjoins the core of sodium percarbonate in said coated sodium percarbonate particles.

19. The cleaning composition of claim 15, wherein the coated sodium percarbonate particles have a proportion by weight of the coating layer of from 2 to 10% based on the mass of the sodium percarbonate particle.

20. The cleaning composition of claim 15, wherein the coated sodium percarbonate particles have a mass-based median particle size in the range from 0.2 to 5 mm and less than 10% by weight of the particles are smaller than 0.2 mm.

* * * * *